(12) United States Patent
He et al.

(10) Patent No.: US 11,523,003 B2
(45) Date of Patent: *Dec. 6, 2022

(54) INTERCOM DEVICES AND METHODS FOR ADAPTIVELY ADJUSTING POWER CONSUMPTION THEREOF

(71) Applicant: ZHEJIANG DAHUA TECHNOLOGY CO., LTD., Zhejiang (CN)

(72) Inventors: Jiahuan He, Hangzhou (CN); Kang Du, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/168,204

(22) Filed: Feb. 5, 2021

(65) Prior Publication Data

US 2021/0160379 A1    May 27, 2021

Related U.S. Application Data

(63) Continuation of application No. 16/563,975, filed on Sep. 9, 2019, now Pat. No. 10,931,831, which is a (Continued)

(30) Foreign Application Priority Data

Apr. 13, 2017 (CN) .......................... 201710239325.9

(51) Int. Cl.
*H04M 19/08* (2006.01)
*H04M 1/02* (2006.01)

(52) U.S. Cl.
CPC ......... *H04M 19/08* (2013.01); *H04M 1/0291* (2013.01)

(58) Field of Classification Search
CPC ............................ H04M 19/08; H04M 1/0291
(Continued)

(56) References Cited

U.S. PATENT DOCUMENTS

| 6,385,547 B1 * | 5/2002 | Bogli | ............... | G01R 19/16576 |
| | | | | 702/65 |
| 2009/0037752 A1 * | 2/2009 | Takiguchi | ................. | G06F 1/26 |
| | | | | 713/300 |

(Continued)

FOREIGN PATENT DOCUMENTS

| CN | 103701351 A | 4/2014 |
| CN | 203968268 U | 11/2014 |

(Continued)

OTHER PUBLICATIONS

International Search Report in PCT/CN2018/077399 dated May 22, 2018, 4 pages.

(Continued)

*Primary Examiner* — Maria El-Zoobi
(74) *Attorney, Agent, or Firm* — Metis IP LLC

(57) ABSTRACT

A system and method for adjusting power consumption of a power consumer (e.g., an intercom device) may include a power supply, the power consumer connected to the power supply through a transmitting device, and at least one processor. The at least one processor may be configured to obtain a first voltage associated with the power supply and a second voltage associated with the power consumer, and adjust an operation status of the power consumer at least based on the first voltage and the second voltage. The first voltage may be an output voltage of the power supply, and the second voltage may be an input voltage of the power consumer.

20 Claims, 9 Drawing Sheets

Related U.S. Application Data continuation of application No. PCT/CN2018/077399, filed on Feb. 27, 2018.

(58) Field of Classification Search
 USPC .......................................................... 379/176
 See application file for complete search history.

(56) References Cited

U.S. PATENT DOCUMENTS

| 2013/0290748 | A1* | 10/2013 | Zhu | ............................ | G06F 1/28 |
| | | | | | 713/300 |
| 2015/0085178 | A1 | 3/2015 | Aoki | | |
| 2020/0007692 | A1 | 1/2020 | He et al. | | |

FOREIGN PATENT DOCUMENTS

| CN | 204948033 U | 1/2016 |
|----|-------------|--------|
| CN | 205017314 U | 2/2016 |
| CN | 105589498 A | 5/2016 |
| CN | 205356571 U | 6/2016 |
| JP | 5242842 B1 | 7/2013 |
| JP | 2013135351 A | 7/2013 |
| JP | 2014138391 A | 7/2014 |
| JP | 2015056830 A | 3/2015 |
| JP | 2015080191 A | 4/2015 |

OTHER PUBLICATIONS

Written Opinion in PCT/CN2018/077399 dated May 22, 2018, 5 pages.
First Office Action in Chinese Application No. 201710239325.9 dated Apr. 3, 2019, 13 pages.
The Extended European Search Report in European Application No. 18784516.9 dated Dec. 2, 2019, 8 pages.
Communication Pursuant to Article 94(3) EPC in European Application No. 18784516.9 dated Jan. 12, 2021, 7 pages.

* cited by examiner

400

> Obtaining a first voltage associated with a power distributor and a second voltage associated with a power consumer, the power consumer being connected to the power distributor through a transmitting device — 402

> Adjusting a working status of the power consumer at least based on the first voltage and the second voltage — 404

FIG. 4

INTERCOM DEVICES AND METHODS FOR ADAPTIVELY ADJUSTING POWER CONSUMPTION THEREOF

CROSS REFERENCE

This application is a continuation of U.S. application Ser. No. 16/563,975, filed on Sep. 9, 2019, which is a continuation of International Application No. PCT/CN2018/077399, filed on Feb. 27, 2018, which claims priority to Chinese Application No. 201710239325.9, filed on Apr. 13, 2017. Each of the above-referenced applications is hereby incorporated by reference in their entireties.

TECHNICAL FIELD

The present disclosure typically relates to a method and apparatus for communication, and more specifically to an intercom device, and a method to adjust power consumption of the intercom device.

BACKGROUND

Presently, as illustrated in FIG. 1, a video intercom system 150 commercially available in the market consist of a visitor user terminal 110, a power source 120, one or more distributors 130 (e.g., distributor 1, distributor 2, ... distributor N, etc.), and one or more indoor intercom terminals 140 (e.g., indoor intercom terminal 1, indoor intercom terminal 2, ... indoor intercom terminal N, etc.). The terminals may be interconnected through cables (e.g., network cables). For example, the distributor 130 may be connected to an indoor intercom device through a network cable. The indoor intercom terminal 140 may interact with a user (e.g., a host of where the indoor intercom terminal 140 is installed), collect information input by the user, and generate corresponding signals (e.g., audio and/or video signals). The visitor user terminal 110 may interact with a visitor (e.g., a visitor of where the indoor intercom terminal 140 is installed), collect information input by the visitor, and generate corresponding signals (e.g., audio and/or video signals). The distributor 130 may transmit audio and video signals that are generated by the visitor user terminal 110 to the indoor intercom terminal 140, or vice versa, and/or supply power to the indoor intercom terminal 140 through the network cable. In some embodiments, the resistance of the network cable that connects the distributor 130 and the indoor intercom terminal 140 may be relatively large due to factors including, a relatively long length of the network cable and/or a relatively poor electric conductivity of the network cable, resulting in a relatively large voltage drop (or referred to as voltage difference) between the distributor 130 and the indoor intercom terminal 140. When the voltage drop reaches a certain value, the input voltage of the indoor intercom terminal 140 may be relatively low, causing the indoor intercom terminal 140 unable to restart or work properly. There is a need for methods and systems to adjust the power consumption of the indoor intercom terminal 140, ensuring the indoor intercom terminal 140 to work properly under a relatively low input voltage.

SUMMARY

According to an aspect of the present disclosure, a system for adjusting power consumption of a power consumer (e.g., an intercom device) may include a power supply, the power consumer connected to the power supply through a transmitting device, and at least one processor. The at least one processor may be configured to obtain a first voltage associated with the power supply and a second voltage associated with the power consumer, and adjust an operation status of the power consumer at least based on the first voltage and the second voltage.

In some embodiments, the first voltage may be an output voltage of the power supply, and the second voltage may be an input voltage of the power consumer.

In some embodiments, to adjust the operation status of the power consumer, the at least one processor may be configured to obtain a mapping table that includes at least one reference index for the power consumer, identify a target index from the at least one reference index at least based on the first voltage and the second voltage, and adjust the operation status of the power consumer based on the identified target index.

In some embodiments, the mapping table may associate the at least one reference index for the power consumer with at least one reference voltage difference. To identify the target index, the at least one processor may be configured to identify a target voltage difference corresponding to a voltage difference between the first voltage and the second voltage from the at least one reference voltage difference, and identify a reference index corresponding to the target voltage difference to be the target index.

In some embodiments, the at least one processor may be further configured to: upon determining that the voltage difference between the first voltage and the second voltage is no less than a threshold value, send an alarm signal for adjusting a resistance of the transmitting device.

In some embodiments, the at least one processor may be further configured to obtain an input current of the power consumer.

In some embodiments, the mapping table may associate the at least one reference index for the power consumer with at least one reference resistance of the transmitting device. To identify the target index, the at least one processor is configured to identify the target index from the at least one reference index based on the input current of the power consumer, the first voltage, and the second voltage.

In some embodiments, to identify the target index, the at least one processor may be configured to: determine a resistance of the transmitting device based on the input current of the power consumer, the first voltage, and the second voltage; identify, from the at least one reference resistance, a target resistance corresponding to the determined resistance of the transmitting device; and identify a reference index corresponding to the target resistance to be the target index.

In some embodiments, to adjust the operation status of the power consumer, the at least one processor is configured to adjust an operation index of the power consumer to be the target index.

In some embodiments, the operation index of the power consumer may be at least associated with a volume of the power consumer or a backlight brightness of the power consumer.

In some embodiments, the power consumer may include an intercom device.

According to another aspect of the present disclosure, a method for adjusting power consumption of a power consumer (e.g., an intercom device) may include: obtaining, by at least one processor, a first voltage associated with a power supply and a second voltage associated with a power consumer, the power consumer being connected to the power supply through a transmitting device; and adjusting, by the at least one processor, an operation status of the power consumer at least based on the first voltage and the second voltage.

In some embodiments, the first voltage may be an output voltage of a power supply and the second voltage may be an input voltage of the power consumer.

In some embodiments, the adjusting of the operation status of the power consumer may include: obtaining a mapping table that includes at least one reference index for the power consumer; identifying a target index from the at least one reference index at least based on the first voltage and the second voltage; and adjusting the operation status of the power consumer based on the identified target index.

In some embodiments, the mapping table may associate the at least one reference index for the power consumer with at least one reference voltage difference. The identifying of the target index may include: identifying, from the at least one reference voltage difference, a target voltage difference corresponding to a voltage difference between the first voltage and the second voltage; and identify a reference index corresponding to the target voltage difference to be the target index.

In some embodiments, the method may further include: upon determining that the voltage difference between the first voltage and the second voltage is no less than a threshold value, sending an alarm signal for adjusting a resistance of the transmitting device.

In some embodiments, the method may further include: obtain an input current of the power consumer.

In some embodiments, the mapping table may associate the at least one reference index for the power consumer with at least one reference resistance of the transmitting device. The identifying of the target index may include: identifying the target index from the at least one reference index based on the input current of the power consumer, the first voltage, and the second voltage.

In some embodiments, the identifying of the target index may include: determining a resistance of the transmitting device based on the input current of the power consumer, the first voltage, and the second voltage; identifying, from the at least one reference resistance, a target resistance corresponding to the determined resistance of the transmitting device; and identifying a reference index corresponding to the target resistance to be the target index.

In some embodiments, the method may further include: upon determining that the resistance of the transmitting device is no less than a threshold value, sending an alarm signal for adjusting the resistance of the transmitting device.

In some embodiments, the adjusting of the operation status of the power consumer may include: adjusting an operation index of the power consumer to be the target index.

In some embodiments, the operation index of the power consumer may be at least associated with a volume of the power consumer or a backlight brightness of the power consumer.

According to another aspect of the present disclosure, a non-transitory computer readable medium for adjusting power consumption of a power consumer (e.g., an intercom device) may store instructions which when executed by a processor cause the processor to execute operations including: obtaining a first voltage associated with a power supply and a second voltage associated with a power consumer, the power consumer being connected to the power supply through a transmitting device; and adjusting an operation status of the power consumer at least based on the first voltage and the second voltage.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 4 is a flowchart of an exemplary process for adjusting operation status of an intercom device according to some embodiments of the present disclosure;

DETAILED DESCRIPTION

Figure 1:
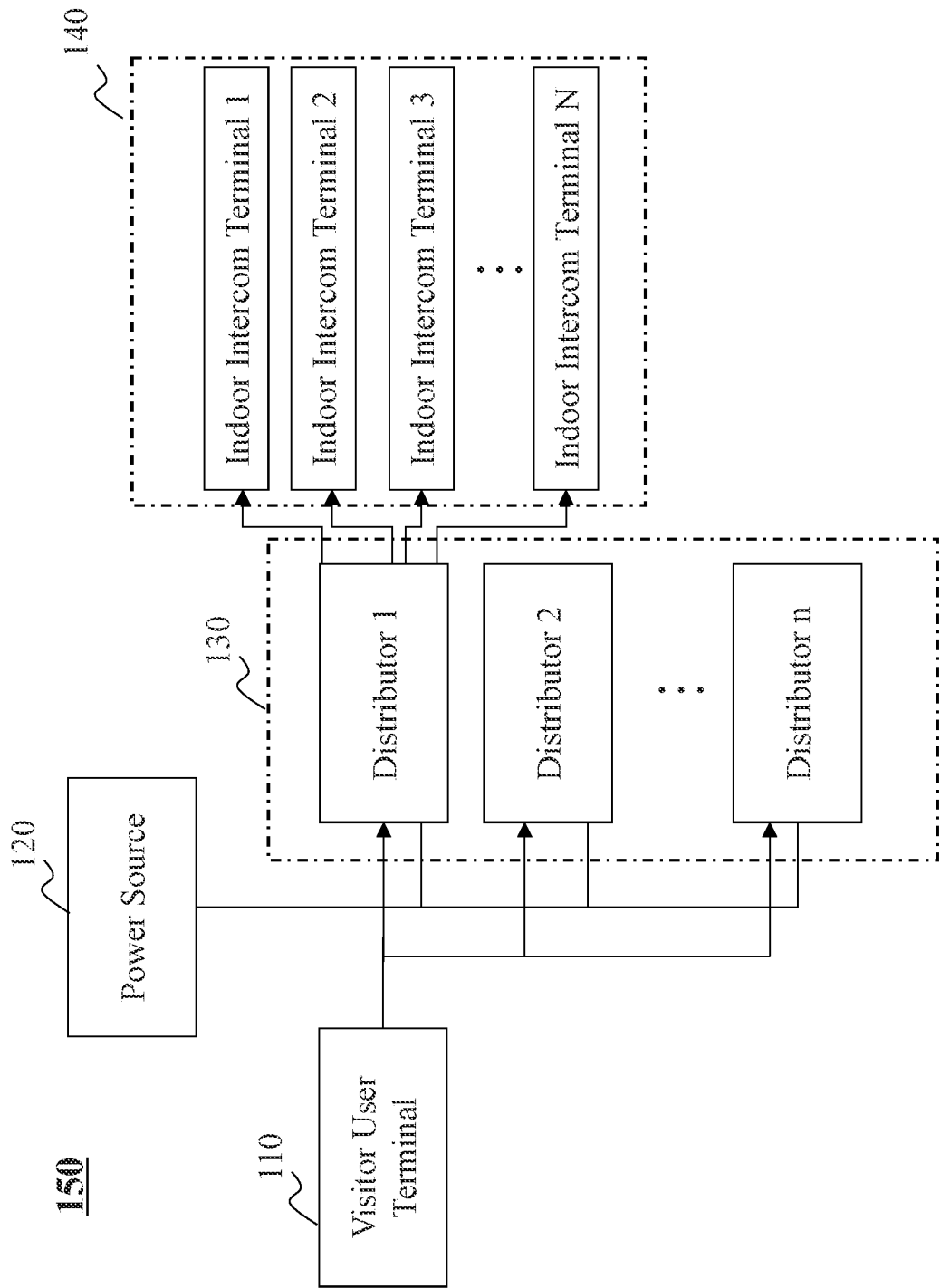
FIG. 1 is a schematic diagram illustrating an exemplary intercom system in prior art.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a", "an", and "the" may be intended to include the plural forms as well, unless the context clearly indicates otherwise. It will be further understood that the terms "comprise", "comprises", and/or "comprising", "include", "includes", and/or "including", when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

The modules (or units, blocks, units) described in the present disclosure may be implemented as software and/or hardware modules and may be stored in any type of non-transitory computer-readable medium or other storage device. In some embodiments, a software module may be compiled and linked into an executable program. It will be appreciated that software modules can be callable from other modules or from themselves, and/or can be invoked in response to detected events or interrupts. Software modules configured for execution on computing devices can be provided on a computer readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in a firmware, such as an EPROM. It will be further appreciated that hardware modules (e.g., circuits) can be included of connected or coupled logic units, such as gates and flip-flops, and/or can be included of programmable units, such as programmable gate arrays or processors. The modules or computing device functionality described herein are preferably implemented as hardware modules, but can be software modules as well. In general, the modules described herein refer to logical modules that can be combined with other modules or divided into units despite their physical organization or storage.

Generally, the word "module," "sub-module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts.

Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

An aspect of the present disclosure relates to an intercom system in a building. The intercom system may include a power supply providing power to a plurality of intercom devices distributed in different positions of a building. Based on the distances between an intercom device and the power supply and/or other factors, the resistance between the intercom device and the power supply may sometime be large enough to consume too much power, so that the intercom device may not have enough power to normally operate. The intercom system of the present disclosure is configured to determine the voltage drop caused by the resistance between the power supply and an intercom device, and adjust the power consumption of the intercom device accordingly. For example, the system may adjust the brightness of a screen and loudness of a speaker of the intercom device according to the amount of power that can be transmitted thereto.

Figure 2:
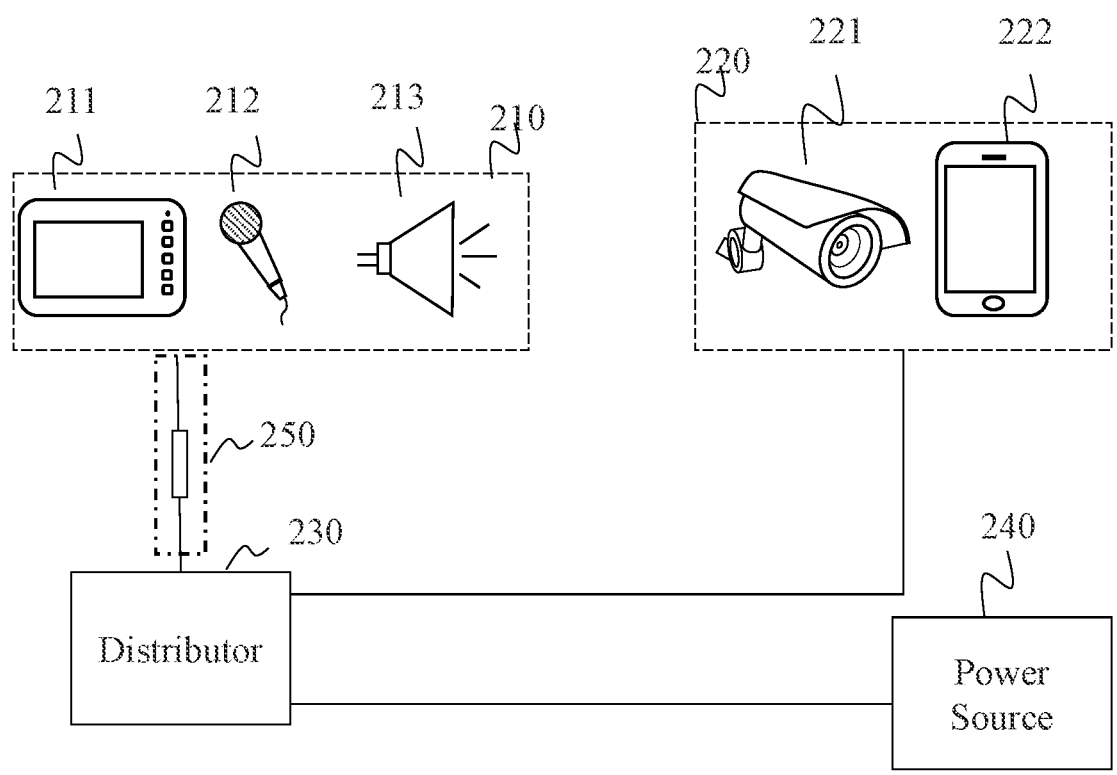
FIG. 2 is a schematic diagram illustrating an exemplary intercom system according to some embodiments of the present disclosure.

FIG. 2 is a schematic diagram illustrating an exemplary intercom system 100 according to some embodiments of the present disclosure. As illustrated, the intercom system 100 may include an intercom device 210, a visitor terminal 220, a distributor 230, and a power source 240. The intercom device 210 may be connected to the distributor 230 through a transmitting device 250. In some embodiments, the transmitting device 250 may have a certain resistance, resulting in a voltage drop (or referred to as voltage difference) between the output voltage of the distributor and the input voltage of the intercom device, during the transmission of the power from the distributor 230 to the intercom device 210. Merely for illustration purpose, the present disclosure uses the system structure as shown in FIG. 2 as an example of the intercom system 100. One of ordinary skill in the art at the time of filing of this disclosure would understood that the system structure of single electronic device is equally well-known among the ordinary skilled person in the art.

The intercom device 210 may transmit signals to, and/or receive signals from the visitor terminal 220. Exemplary signals may include video signals, audio signals, or the like, or any combination thereof. In some embodiments, the intercom device 210 may generate signals based on information input by a user (e.g., a host of where the intercom device 210 is installed), and transmit the generated signals to the visitor terminal 220. For example, the intercom device 210 may collect audio messages of the user, generate corresponding audio signals, and transmit the generated audio signals to the visitor terminal 220. As another example, the intercom device may receive a command input by the user through buttons on the intercom device 210, and send the command to the visitor terminal 220.

In some embodiments, as illustrated in FIG. 2, the intercom device 210 may be or may include a display panel 211, a microphone 212, a loudspeaker 213, or the like, or a combination thereof, for outputting or receiving a signal. For example, the microphone 212 may receive audio messages of the user. As another example, the display panel 211 and/or the loudspeaker 213 may output information transmitted from the visitor terminal 220. Exemplary information transmitted from the visitor terminal 220 may include an image of a visitor, an audio message of the visitor, a command input by the visitor, or the like, or any combination thereof. In some embodiments, the arrangement of the components of the intercom device 210 may be various. For example, the microphone 212 and the loudspeaker 213 may be installed on, inside, or outside the display panel 211.

In some embodiments, the intercom device 210 may embed and/or save at least one technical index associated with operation status (e.g., power consumption) of the intercom device 210. The intercom device 210 may adjust the technical index based on a voltage drop caused by the transmitting device (and/or the resistance of the transmitting device) and a preset mapping table that maps at least one reference voltage drop corresponding to the transmitting device (and/or at least one reference resistances of the transmitting device) with at least one reference technical index (or referred to as reference index). The technical index may include an index associated with power consumption of the intercom device 210. Exemplary technical index may include a backlight brightness of the intercom device (e.g., screen brightness), volume of the intercom device (e.g., speaker volume), or the like, or any combination thereof. Exemplary reference technical index may include a reference backlight brightness of the intercom device, a reference volume of the intercom device, or the like, or any combination thereof. Detailed description of the adjustment of the technical index may be found elsewhere in the present disclosure. See, e.g., FIGS. 4-6 and the descriptions thereof. Merely for the purpose of illustration, the present disclosure uses intercom device 210 to exemplify a power consumer, and is not intended to limit the scope of the present disclosure. As used herein, the power consumer may refer to a device which consumes electricity during operation.

The visitor terminal 220 may transmit signals to, and/or receive signals from the intercom device 210. Exemplary signals may include video signals, audio signals, or the like, or any combination thereof. In some embodiments, the visitor terminal may generate signals based on information input by a visitor (e.g., a visitor of where the intercom device 210 is installed), and transmit the generated signals to the intercom device 210. For example, the intercom device 210 may collect audio messages of the visitor, generate corresponding audio signals, and transmit the generated audio signals to the intercom device 210. As another example, the visitor terminal 220 may receive a command input by the visitor through buttons or microphones on the visitor terminal 220, and send the command to the intercom device 210.

In some embodiments, as illustrated in FIG. 2, the visitor terminal 220 may be or may include a camera 221, a display panel 222, a microphone 223, or the like, or any combination thereof. The camera 222 and the microphone 223 may receive video images and voice information of the user. The display panel 222 may output information transmitted from the intercom device 210. Exemplary information transmitted from the intercom device 210 may include an image of a user, an audio message of the user, a command input by the user, or the like, or any combination thereof. In some embodiments, the display panel may be embodied as a display screen on a device. The device may be fixed in a position or may be a mobile device including a mobile phone, a personal digital assistance (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift®, a Hololens™, a Gear VR™, etc. In some embodiments, the visitor terminal 220 may further include other components including a microphone, a loudspeaker, or the like, or any combination thereof. In some embodiments, the arrangement of the components of the visitor terminal 220 may be various. For example, the camera and the loudspeaker may be installed on, inside, or outside the display panel 222.

The visitor terminal 220 and the intercom device 210 may connect with each other through a wireless and/or wired connection. For example, the visitor terminal 220 and the intercom device 210 may connect to each other through a wireless connection including a Bluetooth™ link, a Wi-Fi™ link, a WiMax™ link, a WLAN link, a ZigBee link, a mobile network link (e.g., 3G, 4G, 5G, etc.), or the like, or a combination thereof. As another example, the visitor terminal 220 and the intercom device 210 may connect to each other through cables (e.g., network cables). As illustrated in FIG. 2, the intercom device 210 and the visitor terminal 220 may connect to each other through the distributor 230, the transmitting device 250 connecting the distributor 230 and the intercom device 210, and the cable(s) connecting the distributor 230 and the visitor terminal 220.

The distributor 230 may communicate with the intercom device 210 and/or provide power to the intercom device 210. In some embodiments, the distributor 230 may connect to the intercom device 210, transmit signals from and/or to the intercom device 210. For example, the distributor 230 may send audio signals of the visitor transmitted from the visitor terminal 220 to the intercom device 210. In some embodiments, the distributor 230 may connect to the power source 240, and transmit power to the intercom device 210 through the transmitting device 250. For illustration purpose, the distributor 230 may also be referred to as a power supply for the intercom device 210, or simply referred to as power supply. Exemplary power source 240 may include a DC power supply, an AC power supply, a programmable power supply, an uninterruptible power supply, a high-voltage power supply, or the like, or any combination thereof. As used herein, the distributor 230 may also referred to as a power supply for the intercom device (or simply referred to as a power supply), or a power distributor.

The transmitting device 250 may connect the intercom device 210 to the distributor 230 to transmit signals between the intercom device 210 and the distributor 230, and/or transmit power from the distributor 230 to the intercom device 210. In some embodiments, the transmitting device 250 may be or may include a cable, a circuit (or referred to as a transmitting circuit), or the like, or any combination thereof. Exemplary cables may include a network cable, an electric wire, or the like, or any combination thereof.

Figure 3:
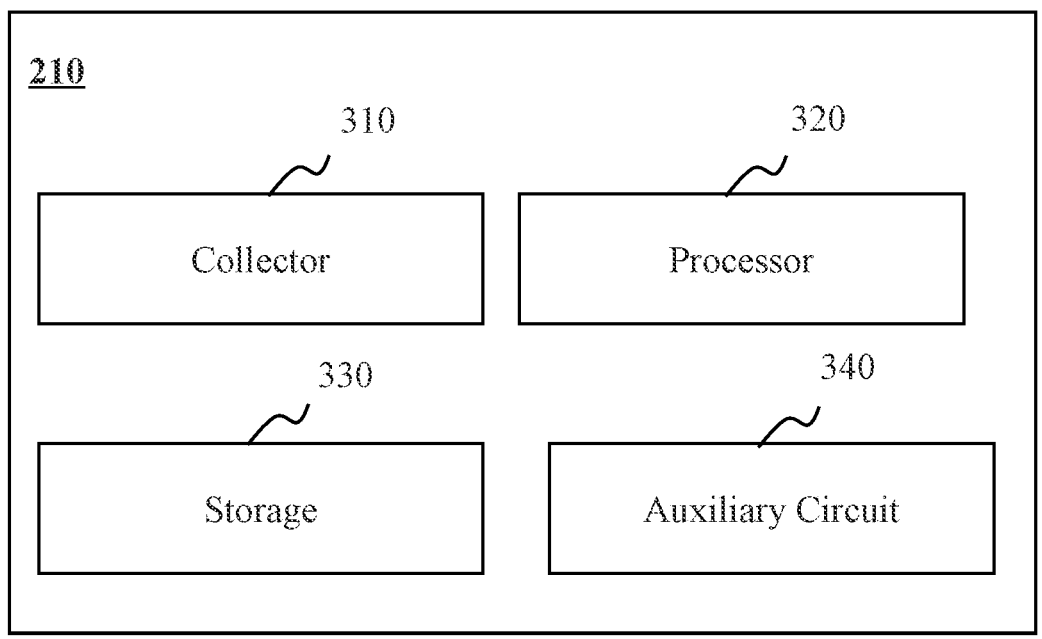
FIG. 3 is an exemplary schematic diagram of an intercom device according to some embodiments of the present disclosure.

FIG. 3 illustrates an exemplary schematic diagram of an intercom device 210 according to some embodiments of the present disclosure. As illustrated in FIG. 3, the intercom device 210 may include a collector 310, a processor 320, a storage 330, and an auxiliary circuit 340.

The collector 310 may collect an input voltage of the intercom device, and/or an input current of the intercom device. In some embodiments, the collector 310 may include an ADC (analog to digital converter) collector (e.g., a signal collector, a signal-acquisition device, and/or a sampling device). The ADC collector may collect analog voltages (and/or currents), and convert the collected analog voltages (and/or currents) to corresponding digital ones. In some embodiments, the collector 310 may transmit the collected voltages (and/or currents) to the processor 320 and/or the storage 330.

The storage 330 may store data, instructions, and/or any other information. In some embodiments, the storage 330 may store data and/or instructions that the processor 320 may execute or use to perform exemplary methods described in the present disclosure. In some embodiments, the storage 330 may store a predetermined output voltage of the distributor. In some embodiments, the storage 330 may store a mapping table that map at least one reference voltage drop corresponding to the transmitting device (and/or at least one resistance of the transmitting device) with at least one reference technical index. For example, the storage 330 may store a first mapping table that associates at least one reference voltage drop with at least one reference technical index. As another example, the storage 330 may store a second mapping table that associates at least one reference resistance of the transmitting device with at least one technical index. In some embodiments, the storage 330 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc.

The processor 320 may adjust an operation status of the intercom device the voltages (and/or currents) transmitted by other components of the intercom device 210 and a mapping table (e.g., the first mapping table, the second mapping table).

The processor 320 may obtain the output voltage of the distributor (or referred to as a first voltage) and the input voltage of the intercom device (or referred to as a second voltage) from the storage and the collector 310, respectively, and adjust the operation status of the intercom device based on the obtained output voltage of the distributor, the input voltage of the intercom device, and a first mapping table. In some embodiments, to adjust the operation status of the intercom device, the processor 320 may determine the voltage difference between the first voltage and the second voltage as the voltage drop caused by the transmitting device between the intercom device 210 and the distributor 230. The processor 320 may identify, from the at least one reference voltage drop, a target voltage drop corresponding to the determined voltage drop, and identify a reference index corresponding to the target voltage difference to be the target index. Then, the processor 320 may adjust a technical index of the intercom device to be the same as the determined reference index. In some embodiments, the processor 320 may determine whether the determined voltage drop is no less than a threshold value. Upon determining that the voltage drop is no less than a threshold value, the processor 320 may send an alarm signal for adjusting a resistance of the transmitting device.

The processor 320 may obtain the output voltage of the distributor (or referred to as a first voltage) from the storage 330, and obtain the input voltage of the intercom device (or referred to as a second voltage) and the input current of the intercom device from the collector 310, and adjust the operation status of the intercom device based on the obtained output voltage of the distributor, the input voltage of the intercom device, the input current of the intercom device, and a second mapping table. In some embodiments, to adjust the operation status of the intercom device, the processor 320 may determine a resistance of the transmitting device based on the input current of the intercom device, the first voltage, and the second voltage. Then, the processor 320 may identify, from the at least one reference resistance, a target resistance corresponding to the determined resistance of the transmitting device, and identify a reference technical index corresponding to the target resistance to be the target technical index (or simply referred to as target index). Then, the processor 320 may adjust a technical index of the intercom device to be the same as the determined reference technical index.

In some embodiments, the processor 320 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The auxiliary circuit 340 may be configured to facilitate operations of one or more components of the intercom device 210 (e.g., the processor 320, the collector 310, etc.). The auxiliary circuit 340 may include a backlight drive circuit, a volume adjustment circuit, a volume control circuit, or the like, or the combination thereof. Detailed description of the auxiliary circuit 340 may be found elsewhere in the present disclosure. See, e.g., FIGS. 7-9 and descriptions thereof.

It should be noted that the above description of the intercom device 210 is merely provided for the purposes of illustration, and not intended to limit the scope of the present disclosure. For persons having ordinary skills in the art, multiple variations and modifications may be made under the teaching of the present invention. However, those variations and modifications do not depart from the scope of the present disclosure. For example, the processor 320 may be separate from the intercom device 210.

FIG. 4 is a flowchart of an exemplary process and/or method for adjusting operation status of an intercom device 210 according to some embodiments of the present disclosure. The process, or a portion thereof, may be implemented on the intercom device 210 as illustrated in FIG. 3. For illustration purposes, the following description is provided with reference to the intercom system 100 as illustrated in FIG. 2. As already described, the intercom system 100 includes processor 320 (as illustrated in FIG. 3).

In process 402, the processor 320 may obtain a first voltage associated with a power distributor (e.g., the distributor 230) and a second voltage associated with a power consumer (e.g., the intercom device 210), the power consumer being connected to the power distributor through a transmitting device 250. The first voltage may be the output voltage of the power distributor. The second voltage may be the input voltage of the power consumer.

In process 404, the processor 320 may adjust an operation status (e.g., power consumption) of the power consumer at least based on the first voltage and the second voltage. In some embodiments, the processor 320 may adjust the operation status of the power consumer based on the first voltage, the second voltage, and a first mapping table. The first mapping table associates at least one reference voltage drop corresponding to the transmitting device with at least one reference technical index. In some embodiments, the processor 320 may adjust the operation status of the power consumer based on the first voltage, the second voltage, the input current of the power consumer, and a second mapping table. The second mapping table may associate the at least one reference resistance of the transmitting device with at least one reference technical index. Detailed description of the adjustment of the operation status may be found elsewhere in the present disclosure. See, e.g., FIG. 3 and the description thereof.

Figure 5:
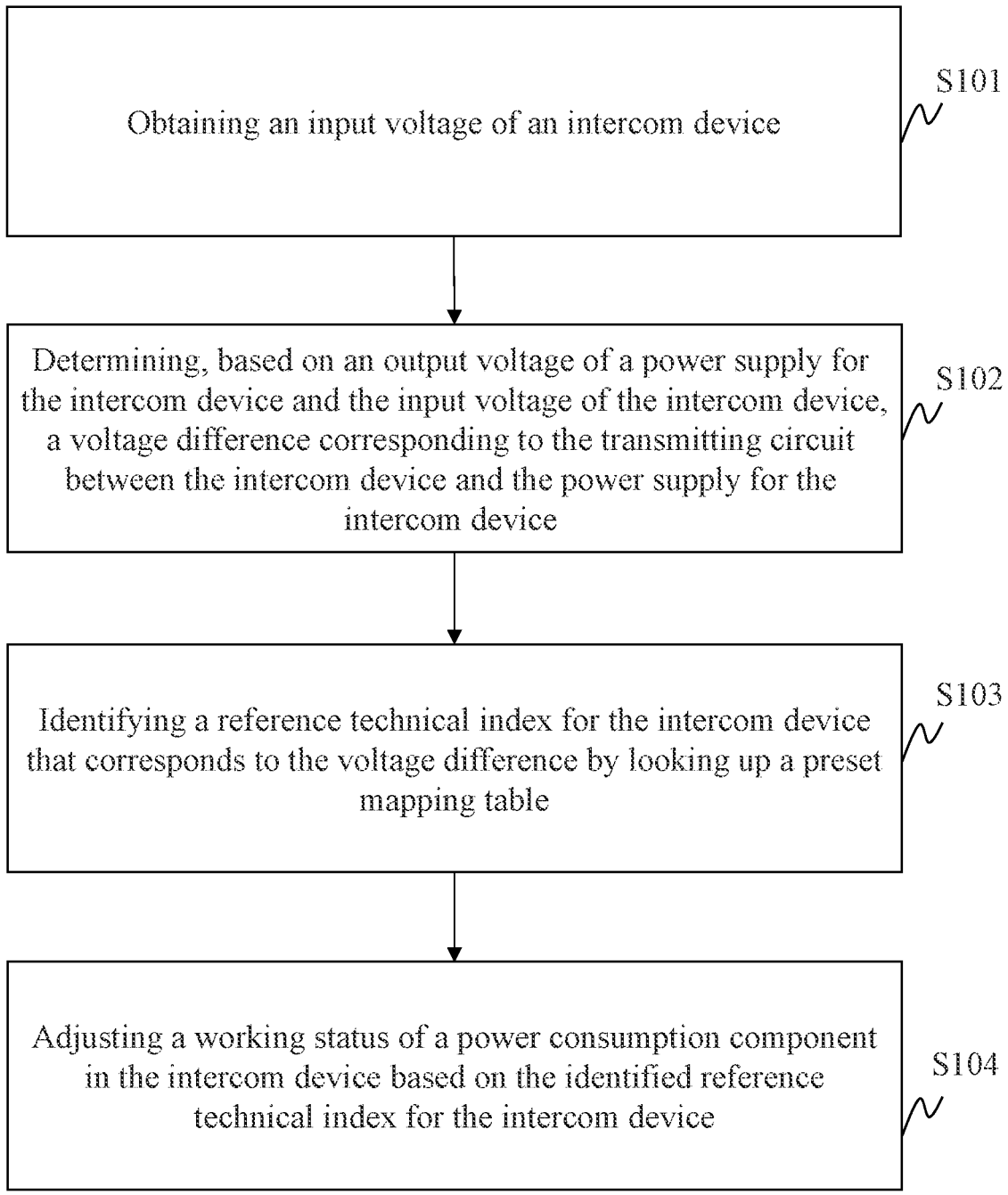
FIG. 5 is a flowchart of an exemplary process for adjusting operation status of an intercom device according to some embodiments of the present disclosure.

FIG. 5 is a flowchart of an exemplary process and/or method for adjusting operation status of an intercom device 210 according to some embodiments of the present disclosure. For example, the process and/or method may be implemented as a set of instructions in the storage 330 of the intercom device. The processor 320 may execute the set of instructions and perform the process and/or method.

In S101, the processor 320 may obtain an input voltage of an intercom device 210.

In S102, the processor 320 may determine, based on an output voltage of a power supply for the intercom device and the input voltage of the intercom device, a voltage difference corresponding to the transmitting device 250 between the intercom device 210 and the power supply for the intercom device.

In S103, the processor 320 may look up a preset mapping table and identify therein a reference technical index for the intercom device that corresponds to the voltage difference. As used herein, a technical index may also be referred to as an index. As used herein, a reference technical index may also be referred to as a reference index. As used herein, the reference technical index for the intercom device that corresponds to the voltage difference may also be referred to as a target index.

In S104, the processor 320 may adjust an operation status of a power consumption component in the intercom device 210 based on the identified reference technical index for the intercom device.

In some embodiments, the processor 320 may establish a mapping relationship between the voltage difference which corresponds to the transmitting circuit between the intercom device 210 and the power supply for the intercom device, and the reference technical index for the intercom device before executing operation S101. For example, the mapping relationship may be pre-stored in the storage 330 of the intercom device 210. Thus, the processor 320 may determine the reference technical index based on the determined voltage difference. The processor 320 may determine the voltage difference based on the output voltage of the power supply for the intercom device and the input voltage of the intercom device. In some embodiments, the output voltage of the power supply may be obtained by an ADC collector. The ADC collector may locate inside or outside the intercom device 210. The ADC collector locating outside the intercom device 210 may connect to the intercom device 210 in a wired or wireless manner. In some embodiments, the ADC collector may collect analog input voltages of the intercom device within a preset time period. In some embodiments, the ADC collector may send the collected analog input voltages to the intercom device 210 (e.g., to the processor 320 of the intercom device), based on which the processor 320 may determine the voltage difference corresponding to transmitting circuit between the intercom device 210 and the power supply for the intercom device.

The intercom device 210 may have a minimum operation voltage. A user of the intercom device (e.g., the developer of the intercom device) may pre-determine (and therefore preset) a maximum power consumption of the intercom device which may be associated with one or more technical indexes, according to the minimum operation voltage thereof. The user may further generate a mapping table that maps voltage differences and technical indexes. As shown in table 1, the technical index may include backlight brightness and volume. The backlight brightness and volume may be pre-divided into 10 levels corresponding to actual backlight brightness or volume values. The backlight brightness may be divided into 10 levels corresponding to different brightness. The volume may be divided into 10 levels corresponding to different volume magnitude. Higher levels may correspond to higher brightness or higher volume magnitude. The processor 320 of the intercom device may adjust the backlight brightness or the volume of the intercom device based on the determined voltage difference and table 1.

TABLE 1

| Voltage Difference | Volume | Backlight brightness |
|---|---|---|
| 0~5 V | 10 | 10 |
| 5~10 V | 9 | 9 |
| 10~15 V | 8 | 8 |
| 15~20 V | 7 | 7 |
| 20~25 V | 6 | 6 |
| 25~30 V | 5 | 5 |
| 30~35 V | 4 | 4 |
| 35~40 V | 3 | 3 |
| 40~45 V | 2 | 2 |
| >50 V | 1 | 1 |

The processor 320 may identify the reference backlight brightness or reference volume corresponding to the determined voltage difference and adjust the backlight brightness or the volume of the intercom device according to the identified reference backlight brightness and/or reference volume. In some embodiments, the processor 320 may adjust the current in the backlight drive circuit 204 in the intercom device 210, such that the maximum backlight brightness of the intercom device is the same as the determined reference backlight brightness. In some embodiments, the processor 320 may adjust the current in the volume control circuit 205 such that the maximum volume of the intercom device is the same as the determined reference volume. In some embodiments, the processor may adjust the current in the backlight drive circuit 204 as well as the current in the volume control circuit 205. For example, the intercom device 210 may be a visible intercom device 210 including a LCD display and a speaker, and the power consumption thereof may mainly relates to the backlight brightness of the LCD display and the volume of the speaker. Thus, the processor 320 may adjust the backlight brightness of the LCD display and the volume of the speaker to adjust the power consumption of the intercom device.

In some embodiments, the processor 320 may determine whether the voltage difference is greater than a first set threshold (e.g., 50V). If the voltage difference is no greater than the first threshold, the processor 320 may look up the mapping table for the corresponding backlight brightness and/or volume. If the voltage difference is greater than the first threshold, the processor 320 may send an alarm signal for adjusting (e.g., changing) the transmitting circuit between the intercom device 210 and the power supply.

Figure 6:
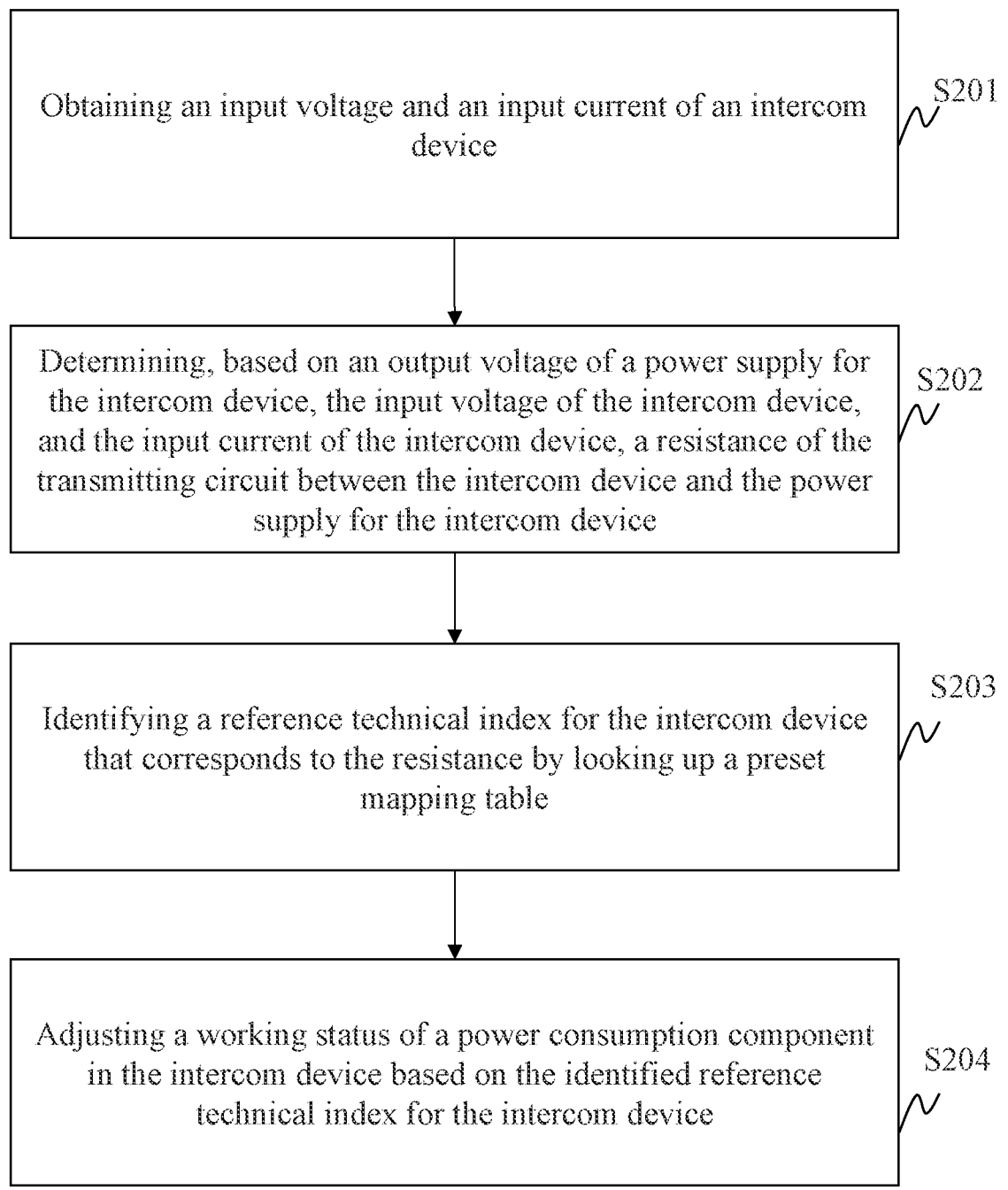
FIG. 6 is a flowchart of an exemplary process for adjusting operation status of an intercom device according to some embodiments of the present disclosure.

FIG. 6 is a flowchart of an exemplary process 600 for adjusting power consumption of an intercom device 210 according to some embodiments of the present disclosure.

In S201, the processor 320 may obtain an input voltage and an input current of an intercom device 210.

In S202, the processor 320 may determine the resistance of the transmitting circuit between the intercom device 210 and the power supply for the intercom device based on an output voltage of a power supply for the intercom device, the input voltage of the intercom device, and the input current of the intercom device.

In S203, the processor 320 may identify a reference technical index for the intercom device that corresponds to the resistance by looking up a preset mapping table.

In S204, the processor 320 may adjust an operation status of a power consumption component in the intercom device 210 based on the identified reference technical index for the intercom device. In some embodiments, the processor 320 may establish a mapping relationship between the resistance of the transmitting circuit between the intercom device 210 and the power supply for the intercom device, and the reference technical index for the intercom device before executing operation S101. Thus, the processor 320 may determine the reference technical index based on the determined resistance. The processor 320 may determine the resistance based on the output voltage of the power supply for the intercom device, the input voltage of the intercom device, and the input current of the intercom device. In some embodiments, the output voltage of the power supply may be obtained by an ADC collector. The ADC collector may locate inside or outside the intercom device 210. The ADC collector locating outside the intercom device 210 may connect to the intercom device 210 in a wired or wireless manner. In some embodiments, the ADC collector may collect analog input voltages and analog input currents of the intercom device within a preset time period. In some embodiments, the ADC collector may send the collected analog input voltages and the analog input currents to the intercom device 210 (e.g., to the processor 320 of the intercom device), based on which the processor 320 may determine the resistance of the transmitting circuit between the intercom device 210 and the power supply for the intercom device.

The intercom device 210 may have a minimum operation voltage. A user of the intercom device (e.g., the developer of the intercom device) may pre-determine a maximum power consumption of the intercom device which may be associated with one or more technical indexes, according to the minimum operation voltage thereof. The user may further generate a mapping table that maps resistances of the transmitting circuit and technical indexes for the intercom device. As shown in table 2, the technical index may include backlight brightness and volume. The backlight brightness and volume may be pre-divided into 10 levels corresponding to actual backlight brightness or volume values. The backlight brightness may be divided into 10 levels corresponding to different brightness. The volume may be divided into 10 levels corresponding to different volume magnitude. Higher levels may correspond to higher brightness or higher volume magnitude. The processor 320 of the intercom device may adjust the backlight brightness or the volume of the intercom device based on the determined resistance and table 2.

TABLE 2

| Resistance of the transmitting circuit | Volume | Backlight brightness |
| --- | --- | --- |
| 0~5Ω | 10 | 10 |
| 5~100Ω | 9 | 9 |
| 10~15Ω | 8 | 8 |
| 15~20Ω | 7 | 7 |
| 20~25Ω | 6 | 6 |
| 25~30Ω | 5 | 5 |
| 30~35Ω | 4 | 4 |
| 35~40Ω | 3 | 3 |
| 40~45Ω | 2 | 2 |
| >50Ω | 1 | 1 |

Figure 7:
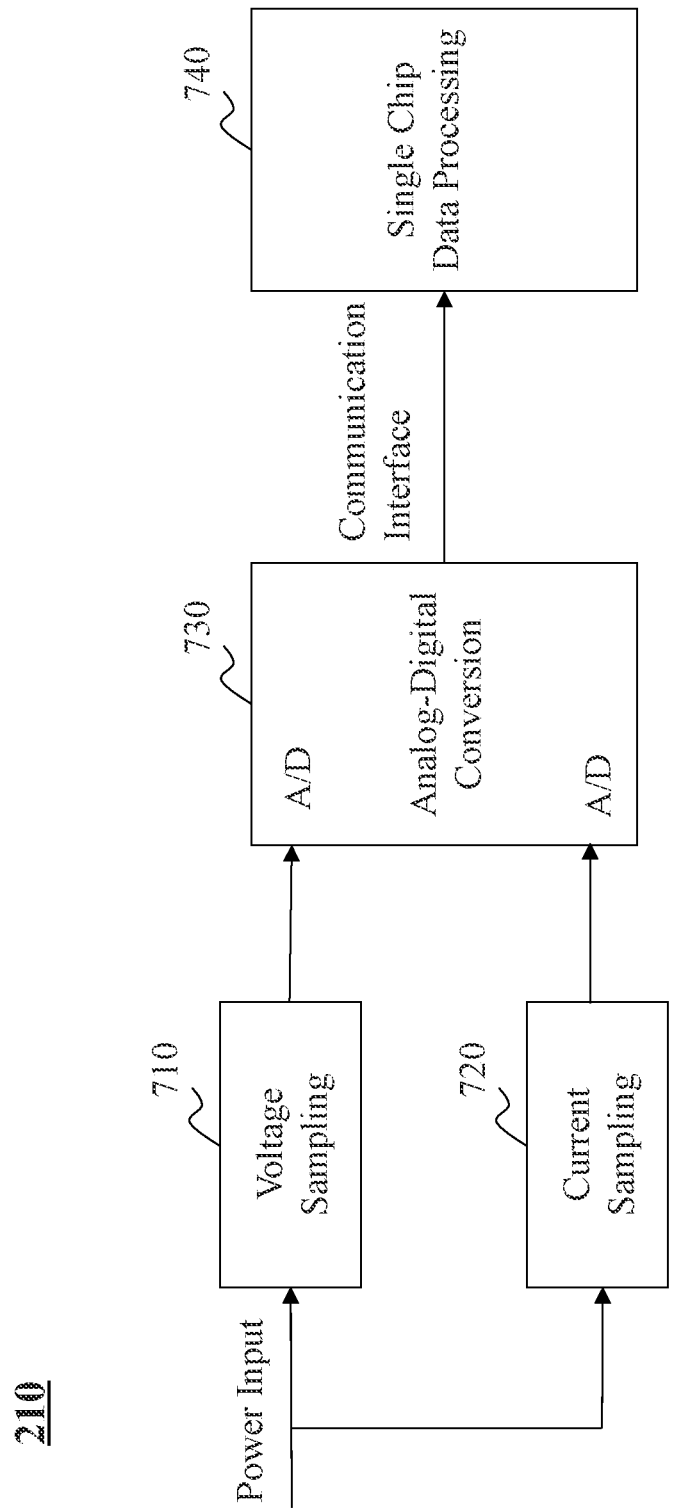
FIG. 7 is a schematic diagram illustrating an exemplary intercom device according to some embodiments of the present disclosure.

In some embodiments, the ADC collector may convert the analog input voltages and analog input currents to digital input voltages and digital input currents, accordingly. In some embodiments, as illustrated in FIG. 7, the ADC collector may send the digital input voltages and digital input currents to the processor 320. The processor 320 may determine the resistance of the transmitting circuit based on the digital input voltages and digital input currents. The processor 320 may determine the resistance by:

$$R = \frac{V_{out} - V_{in}}{I_{in}} \quad (1)$$

wherein $V_{out}$ is the digital output voltage of the power supply. Vin is the digital input voltage of the intercom device. $I_{in}$ is the digital input current of the the intercom device 210.

Figure 8:
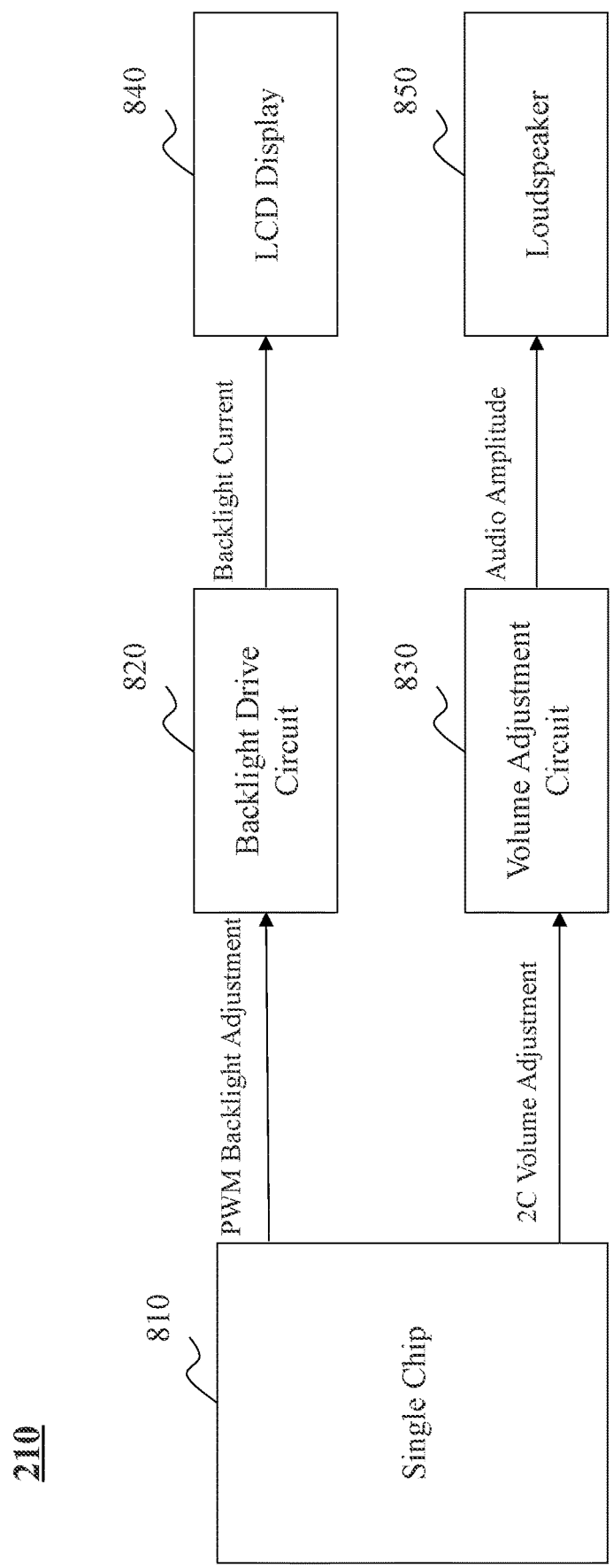
FIG. 8 is a schematic diagram illustrating an exemplary intercom device according to some embodiments of the present disclosure.

The processor 320 may identify the reference backlight brightness or reference volume corresponding to the determined resistance of the transmitting circuit and adjust the backlight brightness or the volume of the intercom device according to the identified reference backlight brightness and/or reference volume. In some embodiments, the processor 320 may adjust the current in the backlight drive circuit in the intercom device 210, such that the maximum backlight brightness of the intercom device is the same as the determined reference backlight brightness. In some embodiments, as illustrated in FIG. 8, the processor 320 may adjust the current in the volume control circuit 205 such that the maximum volume of the intercom device is the same as the determined reference volume. In some embodiments, the process may adjust the current in the backlight drive circuit as well as the current in the volume control circuit 205. For example, the intercom device 210 may be a visible intercom device 210 including a LCD display and a speaker, and the power consumption thereof may mainly relate to the backlight brightness of the LCD display and the volume of the speaker. Thus, the processor 320 may adjust the backlight brightness of the LCD display and the volume of the speaker to adjust the power consumption of the intercom device. As another example, the intercom device 210 may be an intercom device 210 which can not display images, and the processor 320 may adjust current in the volume control circuit 205 to control the power consumption of the intercom device.

In some embodiments, the processor 320 may determine whether the resistance of the transmitting circuit is greater than a first set threshold value (e.g., 50Ω). If the voltage difference is no greater than the first threshold value, the processor 320 may look up the mapping table for the corresponding backlight brightness and/or volume. If the voltage difference is greater than the first threshold value, the processor 320 may send an alarm signal for adjusting (e.g., changing) the transmitting circuit between the intercom device 210 and the power supply.

FIG. 7 is a schematic diagram illustrating an exemplary intercom device 210 according to some embodiments of the present disclosure. As illustrated in FIG. 7, the intercom device 210 may include a voltage sampling (circuit) 710, a current sampling (circuit) 720, an analog-digital conversion (circuit) 730, and a single chip data processing (circuit) 740 (e.g., a microcontroller). The analog-digital conversion (circuit) 730 may send the digital input voltages and digital input currents to the single chip data processing (circuit) 740 for further processing.

FIG. 8 is a schematic diagram illustrating an exemplary intercom device 210 according to some embodiments of the present disclosure. As illustrated in FIG. 8, the intercom device 210 may include a single chip 810 (e.g., a microcontroller), a backlight drive circuit 820, a volume adjustment circuit 830, a LCD display 840, and a loudspeaker 850. As illustrated above, the single chip may adjust the current in the volume adjustment circuit 830 such that the maximum volume of the intercom device is the same as the target reference volume.

Figure 9:
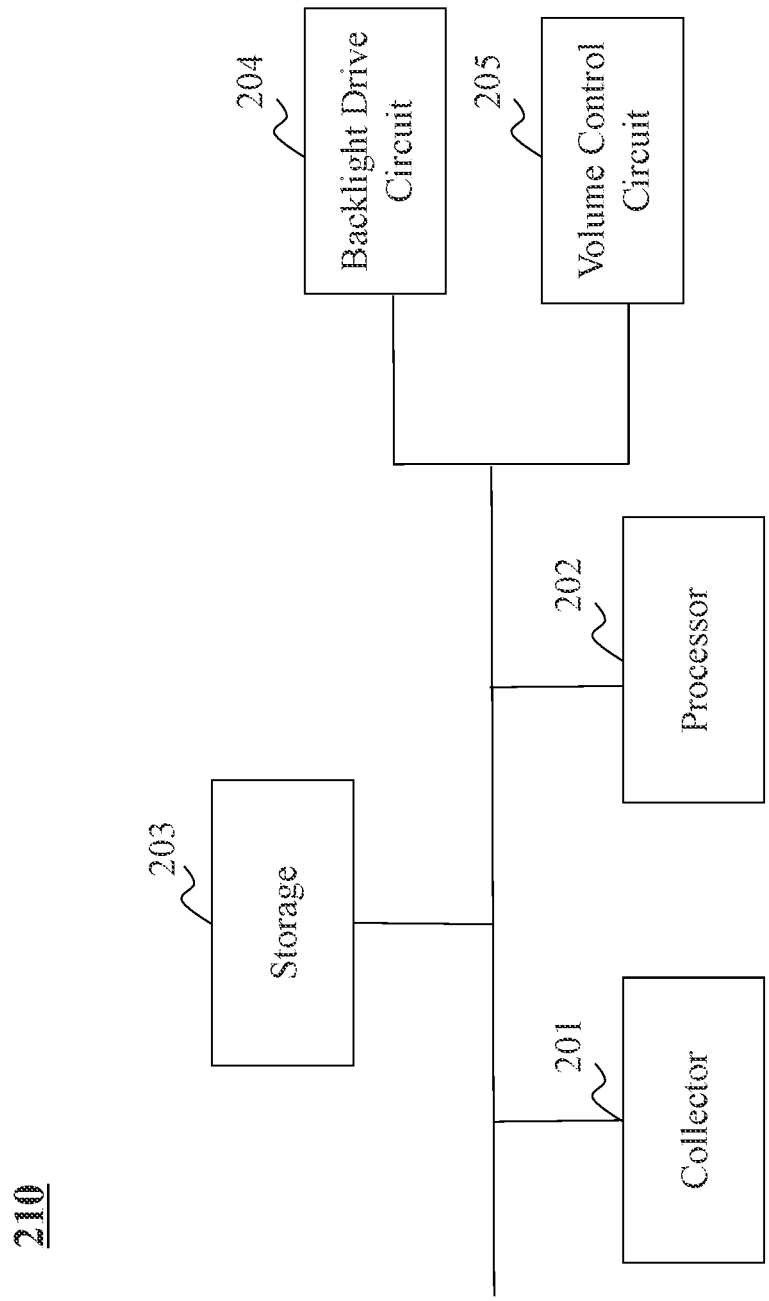
FIG. 9 is a schematic diagram illustrating an exemplary intercom device according to some embodiments of the present disclosure.

FIG. 9 is a schematic diagram illustrating an exemplary intercom device 210 according to some embodiments of the present disclosure. As illustrated in FIG. 9, the intercom device 210 may include a collector 201, a processor 202, a storage 203, a backlight drive circuit 204 and a volume control circuit 205. One or more components of the intercom device 210 may locate inside or outside the intercom device 210. For example, the backlight drive circuit 204 and the volume control circuit 205 may locate in the intercom device 210. As another example, at least one of the backlight drive circuit 204 or the volume control circuit 205 may locate outside the intercom device 210.

The intercom device 210 illustrated in FIG. 9 may be configured to execute operations illustrated in FIG. 5. The collector 201 may be configured to collect an input voltage of the intercom device. The storage 203 may be configured to store instructions to be executed by the processor 202. The processor 202 is configured to obtain the input voltage of the intercom device, determine the voltage difference between the input voltage of the intercom device and an output voltage of the power supply for the intercom device, and search a preset mapping table for the reference technical index for the intercom device which corresponds to the voltage difference. Further, the processor 202 may adjust the backlight drive circuit 204 so that the maximum backlight brightness of the display screen of the intercom device is the same as determined reference brightness, and/or adjust the volume control circuit 205 of the intercom device so that the maximum volume of the intercom device is the same as the reference volume. In some embodiments, the processor 202 may be a single chip.

The intercom device 210 illustrated in FIG. 9 may be configured to execute operations illustrated in FIG. 5. The collector 201 is configured to collect input current value, and input voltage of the intercom device. The processor 202 is configured to obtain input current of the intercom device, input voltage of the intercom device, and the output voltage of the power supply for the intercom device. The processor 202 may determine the resistance of the transmitting circuit between the intercom device 210 and the power supply based on the obtained input current of the intercom device, input voltage of the intercom device, and the output voltage of the power supply. Further, the processor 202 may search a preset mapping table for the reference technical index for the intercom device which corresponds to the resistance. Further, the processor 202 may adjust the backlight drive circuit 204 so that the maximum backlight brightness of the display screen of the intercom device is the same as determined reference brightness, and/or adjust the volume control circuit 205 of the intercom device so that the maximum volume of the intercom device is the same as the reference volume.

In some embodiments, the collector 201 is further configured to collect analog input voltages and analog input currents of the intercom device. The collector 201 is further configured to convert the analog input voltages and analog input currents to digital input voltages and digital input currents, accordingly. In some embodiments, the ADC collector may send the digital input voltages and digital input currents to the processor 202 for further processing. For example, the processor 202 may determine the resistance of the transmitting circuit based on the digital input voltages and digital input currents.

It should be noted that the above embodiments may be illustrated to provide a better understanding of the present disclosure, and is not intended to limit the scope of the present disclosure. In some embodiments, the processor 202 rather than the collector 201 may be configured to convert the obtained analog signals (e.g., the analog input voltages of the intercom device, the analog input currents of the intercom device, etc.) to digital signals.

The present disclosure may also relate to a non-transient computer storage medium configured to execute instructions to adjust the power consumption of the intercom device.

Having thus described the basic concepts, it may be rather apparent to those skilled in the art after reading this detailed disclosure that the foregoing detailed disclosure may be intended to be presented by way of example only and may be not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment may be included in at least one embodiment of the present disclosure. Therefore, it may be emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that may be not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, may be not intended to limit the claimed processes and methods to any order except as may be specified in the claims. Although the above disclosure discusses through various examples what may be currently considered to be a variety of useful embodiments of the disclosure, it may be to be understood that such detail may be solely for that purposes, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purposes of streamlining the disclosure aiding in the understanding of one or more of the various inventive embodiments. This method of disclosure, however, may be not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein may be hereby incorporated herein by this reference in its entirety for all purposes, excepting any prosecution file history associated with same, any of same that may be inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

What is claimed is:

1. A system for communication, comprising:
   a power supply;
   a power consumer connected to the power supply through a transmitting device; and
   at least one processor configured to:
   obtain an output voltage of the power supply and an input voltage of the power consumer; and
   adjust an operation status of the power consumer based at least in part on a voltage difference between the output voltage of the power supply and the input voltage of the power consumer, the voltage difference being a voltage drop caused by the transmitting device.

2. The system of claim 1, wherein to adjust the operation status of the power consumer, the at least one processor is configured to:
   obtain a mapping table that includes at least one reference index for the power consumer;
   identify a target index from the at least one reference index based at least in part on the voltage difference; and
   adjust the operation status of the power consumer based on the identified target index.

3. The system of claim 2, wherein the mapping table associates the at least one reference index for the power consumer with at least one reference voltage difference, and wherein to identify the target index, the at least one processor is configured to:
- identify, from the at least one reference voltage difference, a target voltage difference corresponding to the voltage difference; and
- identify a reference index corresponding to the target voltage difference to be the target index.

4. The system of claim 3, wherein the at least one processor is further configured to:
- upon determining that the voltage difference is no less than a threshold value, send an alarm signal for adjusting a resistance of the transmitting device.

5. The system of claim 2, wherein the at least one processor is further configured to: obtain an input current of the power consumer.

6. The system of claim 5, wherein the mapping table associates the at least one reference index for the power consumer with at least one reference resistance of the transmitting device, and wherein to identify the target index, the at least one processor is configured to:
- identify the target index from the at least one reference index based on the input current of the power consumer and the voltage difference.

7. The system of claim 6, wherein to identify the target index, the at least one processor is configured to:
- determine a resistance of the transmitting device based on the input current of the power consumer and the voltage difference;
- identify, from the at least one reference resistance, a target resistance corresponding to the determined resistance of the transmitting device; and
- identify a reference index corresponding to the target resistance to be the target index.

8. The system of claim 2, wherein to adjust the operation status of the power consumer, the at least one processor is configured to:
- adjust an operation index of the power consumer to be the target index.

9. The system of claim 8, wherein the operation index of the power consumer is at least associated with a volume of the power consumer or a backlight brightness of the power consumer.

10. The system of claim 1, wherein the power consumer includes an intercom device.

11. A method for communication, comprising:
- obtaining, by at least one processor, an output voltage of a power supply and an input voltage of a power consumer, the power consumer being connected to the power supply through a transmitting device; and
- adjusting, by the at least one processor, an operation status of the power consumer based at least in part on a voltage difference between the output voltage of the power supply and the input voltage of the power consumer, the voltage difference being a voltage drop caused by the transmitting device.

12. The method of claim 11, wherein the adjusting of the operation status of the power consumer includes:
- obtaining a mapping table that includes at least one reference index for the power consumer;
- identifying a target index from the at least one reference index based at least in part on the voltage difference; and
- adjusting the operation status of the power consumer based on the identified target index.

13. The method of claim 12, wherein the mapping table associates the at least one reference index for the power consumer with at least one reference voltage difference, and the identifying of the target index includes:
- identifying, from the at least one reference voltage difference, a target voltage difference corresponding to the voltage difference; and
- identify a reference index corresponding to the target voltage difference to be the target index.

14. The method of claim 13, further including:
- upon determining that the voltage difference is no less than a threshold value, sending an alarm signal for adjusting a resistance of the transmitting device.

15. The method of claim 12, further including: obtaining an input current of the power consumer, and wherein the mapping table associates the at least one reference index for the power consumer with at least one reference resistance of the transmitting device, and the identifying of the target index includes:
- identifying the target index from the at least one reference index based on the input current of the power consumer and the voltage difference.

16. The method of claim 15, wherein the identifying of the target index includes:
- determining a resistance of the transmitting device based on the input current of the power consumer and the voltage difference;
- identifying, from the at least one reference resistance, a target resistance corresponding to the determined resistance of the transmitting device; and
- identifying a reference index corresponding to the target resistance to be the target index.

17. The method of claim 16, further including:
- upon determining that the resistance of the transmitting device is no less than a threshold value, sending an alarm signal for adjusting the resistance of the transmitting device.

18. The method of claim 12, wherein the adjusting of the operation status of the power consumer includes:
- adjusting an operation index of the power consumer to be the target index.

19. The method of claim 18, wherein the operation index of the power consumer is at least associated with a volume of the power consumer or a backlight brightness of the power consumer.

20. A non-transitory computer readable medium, storing instructions, the instructions when executed by a processor, causing the processor to execute operations comprising:
- obtaining an output voltage of a power supply and an input voltage of a power consumer, the power consumer being connected to the power supply through a transmitting device; and
- adjusting an operation status of the power consumer based at least in part on the output voltage of the power supply and the input voltage of the power consumer, the voltage difference being a voltage drop caused by the transmitting device.

* * * * *